3,381,242
OPTICAL MASER MODULATOR AND AMPLIFIER
Adolph H. Rosenthal, Forest Hills, N.Y., assignor to
Kollsman Instrument Corporation, Elmhurst, N.Y.,
a corporation of New York
Filed Aug. 28, 1961, Ser. No. 134,521
5 Claims. (Cl. 332—7.51)

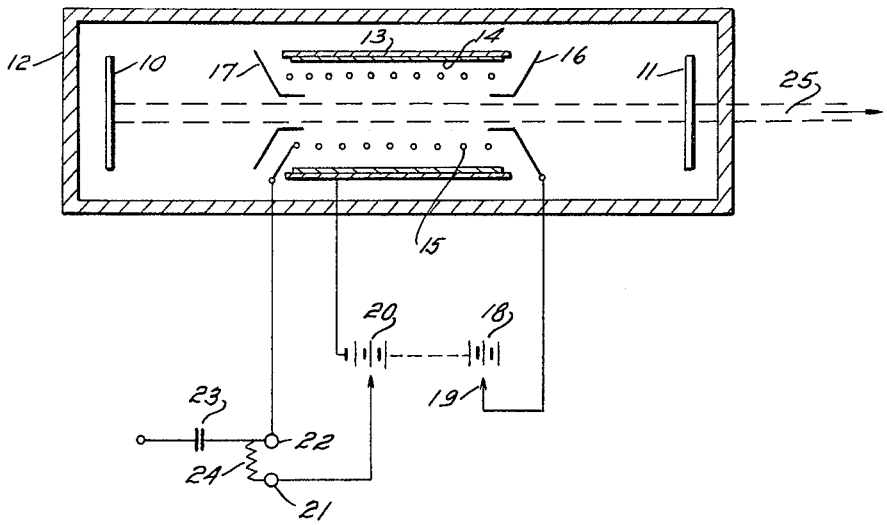

ABSTRACT OF THE DISCLOSURE

A source of electrons controlled in density and intensity is provided within a laser cavity to modulate the output radiation of the laser.

---

This invention relates to optical masers (sometimes called "laser") and more specifically relates to an optical maser which is excited by charged particles moving through a gas in an optical cavity.

Optical masers of different types are well known to the art as sources of coherent radiation for use, for example, in communication and other applications which require a highly coherent light source.

Of the known masers, here is a solid maser source which includes, for example, a ruby crystal which is irradiated or "optically pumped" with a very strong local light source. Other typical solid optical masers use a doped calcium fluoride again with a local light source.

These masers are either of the pulsed type (as in the case of ruby), or may be of the continuous wave type (as in the case of uranium doped calcium fluoride). The pulses of the pulsed types, however, are usually multiple and not adapted for optical radar applications.

A second type of optical maser is represented by a gaseous maser which is electrically excited. That is, the gaseous maser does not rely on "optical pumping" by a separate external light source for its excitation but obtains excitation through the energy transfer by collisions between the atoms of two different gases. Such masers have an improved coherence or monochromaticity of their stimulated emission, since the original spontaneous emission of the radiating gas is much more monochromatic than in the solid devices.

In a typical gaseous maser, a mixture of 90% helium and 10% neon is subjected to an electric discharge whereby energy is first transmitted to the first metastable helium level. By collisions of the second kind, energy is from there transmitted to the neon atoms which are then excited to a state of negative temperature in a maner suitable for stimulated emission or maser action. Thus, transitions can be induced between two levels of inverse population densities.

The spectral coherence in such gaseous optical masers described above is superior to that of the solid type of maser as has been previously indicated.

These gaseous masers are of the continuous wave type; that is, they emit a continuous flow of light energy.

For the purposes of optical ranging or information communication, it is necessary to be able to modulate the light output by predetermined signals, either in the form of pulses or continuously graded signal information, e.g., telephone or television signals.

With the above described optical masers, such modulation requires that the light be sent through a separate light modulator which could be of the Kerr or ultrasonic type. Any light modulator constitutes a component which can considerably lower the optical efficiency of the system, and a Kerr cell modulator usually has an efficiency of the order of 10% nullifying to a great extent the advantages of high brillance inherent in the optical maser. In addition, the light modulator adds considerable complication to the system.

These laminations would be overcome if the optical maser light source itself could be modulated by the signal information.

In addition (the generally hoped for) application of an optical maser as a light amplifier, rather than as an oscillator, implies a sensitive controllability of the excitation and emission mechanism, by carefully adjusting the operating level close to the threshold of self-excitation. Only then can one expect that the varying intensities of incident light beams, as from a weak image, will be linearly amplified, to result in an image of substantially increased intensity.

The main objective of the present invention is to provide an optical maser which, as in the case of the gaseous optical maser, requires no external high power light source and the complete device is contained within an optical cavity, where the output can be directly modulated by signals as contrasted to the need for external light modulator means.

Another principal objective of the invention is to provide an optical maser whose operating level can be adjusted sensitively at or near the oscillation threshold level, for use as a true light amplifier.

More specifically, and in accordance with the present invention, energy transfer is provided by controlled charged particle excitation where, for example, electrons are directed towards a gas or gas mixture contained within an optical cavity. The optical cavity consists essentially of two Fabry-Perot mirrors which are on either side of a low pressure gas container which receives an electron stream of controlled energy. By controlling the energy of the electron stream, it is possible to control the excitation of the atomic levels of the atoms of the low pressure gas within the container. Thus, the output light of the maser can be directly modulated by controlling the energy of the electrons, to avoid thereby the need for auxiliary light modulators in a communication system. By way of example, a signal modulation of the order of 10,000 megacycles can be used to permit transmission of a great number of telephone or television signals on a single light carrier.

The excitation of selected atomic levels in the gas within the optical cavity is determined specifically by the electron excitation cross section of the particular level as a function of the electron energy. These functions are well known and have been determined both experimentally and theoretically for many atomic levels. The maximum of tihs function will determine the optimum acceleration voltage to be chosen for a particular device. In designing a maser in accordance with the present invention, the best excitation levels will be chosen in accordance with their life times to obtain optimum inverted (negative temperature) populations.

These excitation levels may either be of a single gas, or proper levels of one component (e.g., helium) in a gas mixture (helium plus neon).

In view of the simplicity of the device, it will be seen that the device can be easily constructed in accordance with presently available technology where the electron velocities are adjusted depending upon the particular gas to be used.

Accordingly, a primary object of this invention is to provide a novel optical maser having improved efficiency.

Another object of the invention is to provide a novel optical maser which can be used as a light amplifier.

A further object of the invention is to provide a novel optical maser for use in communication systems.

Another object of the invention is to provide a novel optical maser which permits narrow pulse modulation for use in ranging devices.

Another object of this invention is to provide a novel optical maser which uses a gaseous medium in an optical cavity where the gas is bombarded by charged particles of controlled energy.

A further object of this invention is to provide a novel optical maser which can be directly modulated.

A further object of this invention is to provide a novel optical maser which does not require a local high power light source.

A further object of this invention is to provide a novel directly controlled optical maser which has a high degree of spectral coherence.

A still further object of the invention is to provide a novel optical maser for use as a communication device for wide band TV or multiple telephone channels.

These and other objects of my invention will become apparent from the following description of the drawing which illustrates a structure of a maser wherein the concept of the invention can be carried out and is but one typical embodiment which can utilize the novel electrical bombardment concept of the invention.

The maser illustrated is comprised of an optical cavity defined by two mirrors 10 and 11 forming a Fabry-Perot interferometer which are arranged within a low pressure glass container 12 which may have a cylindrical cross section. The mirrors may be spaced a few to 100 inches apart. The mirrors 10 and 11 are secured to the cylinder 12 in any desired manner (not shown). Mirrors 10 and 11 could also be arranged externally of container 12. These mirrors should have a high reflectivity of the order of 99.5% which can be obtained in narrow spectral regions, for instance, by multi-layer reflectors made of alternate layers of zinc sulfide and cryolite of quarter wave thickness. One of the mirrors, e.g. 10, may be totally reflecting for oscillator uses. For amplifier applications both mirrors must be slightly transparent.

Container 12 is filled with the gas to be excited which is at a low pressure such as 1 millimeter of mercury or lower. One gas which could be used in the embodiment herein is the above mentioned neon-helium mixture, although other gases or gas mixtures such as cesium, potassium, or mercury and sodium could be used depending upon conditions of inversion of population with an appropriate adjustment of the accelerating voltage which accelerates the electron beam as will be described hereinafter.

A hollow metal cylinder 13 is supported within container 12 and separated from the container in any desired manner. Cylinder 13 has a suitable electron emissive coating 14 on its internal surface so that cylinder 13 operates as a cathode which emits thermionic electrons towards its axis when cylinder 13 is heated. The cylinder 13 may be heated by passing electrical current therethrough from a source (not shown) or by providing a concentric heater coil or in any other desired manner.

In order to accelerate and control the density of the electron stream emitted from surface 14, a grid 15, in the form of a cylinder, is concentrically located within cathode 13 and again is supported in any desired manner. An anode formed by outwardly flared cylinders 16 and 17 then partially enters the grid 15 to accelerate electrons from surface 14 toward the axis of cylinder 13. Note that the construction of anodes 16 and 17 is typical of only one possible manner of forming the anode and in some embodiments the anodes could be completely external of the ends of cylinder 13. Moreover, the anode could be in the form of a concentric grid structure.

It is only necessary that the cathode 13-14, grid 15 and anode 16 operate in such a way as to impart a particular energy and density to the electrons emitted from surface 14. To this end, any desired control structure could be used. If desired, for example, a plurality of control grids could be used in any usual manner.

In the embodiment of the drawing, the electrons from surface 14 are accelerated from cathode to anode by a field developed from D.C. source 18 which is adjustable at tap 19 and is connected directly across cylinder 13 and anode parts 16 and 17. The electrons may be preferably accelerated to a voltage somewhat above the upper emission level(s) of the stimulated radiation, or that of a primary level which decays to the upper emission level. The accelerating voltages are usually of the order of a few volts to a few tens of volts. In order to control the electron density a bias voltage taken from voltage source portion 20 is connected between grid 15 and cathode 13. Signals connected to signal input terminals 21 and 22 will be superimposed on the bias voltage in the usual manner known in the electron tube art. Thus, an R-C input circuit including capacitor 23 and resistor 24 could couple the input signal circuit to the grid control of the maser as shown.

In the embodiment illustrated in the drawing, an input signal of the order of 10,000 megacycles connected to terminals 21 and 22 can properly modulate a highly coherent light beam 25 which is induced within the optical cavity due to the excitation of the gas by the electron beam and the interaction between the excited atoms and the cavity. The bias voltage can be adjusted to a value where the maser is near the threshold of oscillation. By altering the density of the exciting electrons by the signal voltages, intensity modulation of the stimulated light can be achieved. Also near this threshold, true light amplification can be achieved, for instance, light beams entering mirror 10 will leave mirror 11 with increased intensities, but otherwise unchanged in phase or direction, so that they can form an amplifier but otherwise unchanged image. The modulation as well as amplification can be linearly related to the primary electric or optical signal. Therefore, the invention provides a novel optical gaseous maser which functions as a directly modulated source of spatially and spectrally coherent light. The invention also provides a novel gaseous optical maser light and image amplifier.

In the foregoing the invention has been described solely in connection with specific illustrative embodiments thereof. Since many variations and modifications of the invention will now be obvious to those skilled in the art, I prefer to be bound not by the specific disclosure herein contained but solely by the appended claims.

I claim:

1. An optical maser modulator; said optical maser modulator comprising an enclosed housing and an optical cavity; said optical cavity having a low pressure gas therein; and a source of electrons; the electrons of said source of electrons being passed through said gas within said housing to cause excitation of the atoms of said gas within said optical cavity and the generation of wave energy of a given frequency within said cavity; said electron source comprising a cylindrical cathode operable to emit electrons toward the axis of said cylinder; said axis of said cylinder lying within said optical cavity; and means for modulating said wave energy comprising accelerating means for accelerating the electrons emitted by said cylindrical cathode toward the axis of said cylinder.

2. An optical maser modulator; said optical maser modulator comprising an enclosed housing and an optical cavity; said optical cavity having a low pressure gas therein; and a source of electrons; the electrons of said source of electrons being passed through said gas within said housing to cause excitation of the atoms of said gas within said optical cavity and the generation of wave energy of a given frequency within said cavity; said electron source comprising a cylindrical cathode operable to emit electrons toward the axis of said cylinder; said axis of said cylinder lying within said optical cavity; and means for modulating said wave energy comprising accelerating means for accelerating the electrons emitted by said cylindrical cathode toward the axis of said cylinder, and control means for controlling the intensity of said electrons.

3. An optical maser modulator; said optical maser modulator comprising an enclosed housing and an optical cavity therein; said optical cavity having a low pressure gas therein; and a source of electrons; the electrons of said source of electrons being passed through said gas within said housing to cause excitation of the atoms of said gas within said optical cavity and the generation of wave energy of a given frequency within said cavity; said electron source comprising a cylindrical cathode operable to emit electrons toward the axis of said cylinder; said axis of said cylinder lying within said optical cavity; and means for modulating said wave energy comprising accelerating means for accelerating the electrons emitted by said cylindrical cathode toward the axis of said cylinder; and a grid control means for controlling the density of electrons travelling from said cathode.

4. An optical maser modulator; said optical maser modulator comprising an enclosed housing and an optical cavity; said optical cavity having a low pressure gas therein; and a source of electrons; the electrons of said source of electrons being passed through said gas within said housing to cause excitation of the atoms of said gas within said optical cavity and the generation of wave energy of a given frequency within said cavity; and control means for controlling the density of the electrons emitted by said electron source; said electron source comprising a cylindrical cathode operable to emit electrons toward the axis of said cylinder; said axis of said cylinder lying within said optical cavity; and means for modulating said wave energy comprising accelerating means for accelerating the electrons emitted by said cylindrical cathode toward the axis of said cylinder; and a grid control means for controlling the density of electrons travelling from said cathode.

5. An optical maser modulator; said optical maser modulator comprising an enclosed housing and an optical cavity; said optical cavity having a low pressure gas therein; and a source of charged particles; the charged particles of said source of charged particles being passed through said gas within said housing to cause excitation of the atoms of said gas within said optical cavity and the generation of wave energy of a given frequency within said cavity; and control means for controlling the energy and density of the charged particles emitted by said charged particle source; said charged particle source comprising a cylindrical cathode operable to emit charged particles toward the axis of said cylinder; said axis of said cylinder lying within said optical cavity; and means for modulating said wave energy comprising accelerating means for accelerating the charged particles emitted by said cylindrical cathode toward the axis of said cylinder; and a grid control means for controlling the density of charged particles travelling from said cathode.

References Cited

UNITED STATES PATENTS

| | | | |
|---|---|---|---|
| 2,929,922 | 3/1960 | Schawlow et al. | 88—61 |
| 3,149,290 | 9/1964 | Bennett et al. | 330—4.3 |
| 2,965,795 | 12/1960 | Norton | 330—4 |

OTHER REFERENCES

Darrow, "Excitation of Spectrum Lines by Impact of Electrons With Just the Energy Determined by the Quantum Conditions," Journal of the Optical Society of America, vol. 8, No. 5, May 1924, pp. 691, 692.

Sanders, "Optical Maser Design," Physical Review Letters, vol. 3, No. 2, July 15, 1959, pp. 86–87.

ROY LAKE, *Primary Examiner.*

JEWELL H. PEDERSEN, D. R. HOSTETTER,
*Examiners.*

R. L. WIBERT, *Assistant Examiner.*